Oct. 27, 1953  R. A. HILL  2,657,346
DRY CONTACT RECTIFIER
Filed Oct. 17, 1952
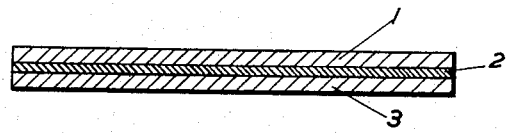
Inventor
RONALD ALFRED HILL
By
Attorney Patented Oct. 27, 1953

2,657,346

UNITED STATES PATENT OFFICE 2,657,346

DRY CONTACT RECTIFIER

Ronald Alfred Hill, London, England, assignor to International Standard Electric Corporation, New York, N. Y., a corporation of Delaware Application October 17, 1952, Serial No. 315,299
In Great Britain October 26, 1951

12 Claims. (Cl. 317—237)

This invention relates to alternating current dry contact rectifiers and has for its object a construction of rectifier suitable for use over a large temperature range.

The main feature of the invention comprises an alternating current rectifier of the dry contact type comprising titanium nitride in intimate contact with a metallic oxide counterelectrode.

Various embodiments of the invention are illustrated in the accompanying drawing the dimensions of which are not to scale the layer thicknesses in particular being exaggerated to varying degrees.

The basis of the present range of rectifiers is the use of titanium nitride 2 in contact with metal oxide 3 as indicated in the drawing.

Various mixtures of oxides having different characteristics may be used as counter-electrodes but the preferred mixtures all contain thallic oxide in a proportion of the order of 10%–20% by weight as conductive element. The reverse voltage when this oxide is used alone is rather low but it has been found that improved properties result when this oxide is used in the proportion named with other metallic oxides. Such oxides are natural and artificial manganese dioxide, bismuth trioxide, antimony trioxide, cerium dioxide, tellurium dioxide. By this means greater reverse voltages can be obtained without prejudice to the conducting properties of the rectifier in the forward direction.

It will be noted that some of the above oxides, e. g. natural and artificial manganese dioxide, bismuth trioxide have conductive properties of their own while others, e. g. cerium and tellurium dioxides, are insulators or near insulators. Owing to the highly conducting properties of thallic oxide the insulating oxides when used with the latter provide useful rectifiers.

It has been found further that oxides accompanying the thallic oxide can be roughly divided into two groups. One group comprising for example natural manganese dioxide, antimony trioxide and bismuth trioxide provide very stable rectifiers which are almost free from ageing or deterioration in service. Their output however particularly at low temperatures is rather low and rectifiers made with them require warming to a high temperature (of the order of 100° C.) before reaching a reasonable output. Another group of oxides comprising for example cerium dioxide, tellurium dioxides and artificial manganese dioxide have useful output over a wide temperature range. They are said to provide activity. Rectifiers made with them are however liable to some deterioration in service.

It has been found experimentally that a suitable admixture of one or more of each group of oxides combines the good properties of both groups, producing a rectifier having useful properties over a wide range of temperature and free from undue ageing or deterioration in service.

So far no single metal oxide has been found commercially suitable per se as counterelectrode with titanium nitride, but such a possibility is within the scope of the present invention. Examples of suitable counterelectrodes are:

(1) 90% $Bi_2O_3$, 10% $Tl_2O_3$ by weight.
(2) 90% natural manganese dioxide, 10% $Tl_2O_3$.
(3) 45% $Bi_2O_3$, 45% natural manganese dioxide, 10% $Tl_2O_3$.
(4) 60% natural manganese dioxide, 30% tellurium dioxide, 10% $Tl_2O_3$.

Such mixtures have lower reverse currents than thallic oxide used alone and the forward currents are hardly affected so that a greater reverse voltage can be used.

Mixed oxide counterelectrodes can be made by simple mechanical admixture, or by evaporating and heating a solution of the nitrates of the metals concerned, followed by compression into discs for clamping to a nitrided baseplate.

Alternatively, oxides can be deposited on a titanium nitride surface by deposition from suspension in powdered form in a volatile carrier medium.

A suitable baseplate for the titanium nitride layer is titanium metal. By heating discs 1 of titanium metal in nitrogen for example for two hours at 800° C., a thin adherent coating 2 of titanium nitride is formed on their surfaces.

Alternatively a base plate 1 of material other than titanium could be used for example, mild steel. To produce a coating of titanium nitride on such a baseplate, nitride is deposited by reaction between titanium tetrachloride, nitrogen, hydrogen as follows:

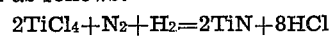

$$2TiCl_4 + N_2 + H_2 = 2TiN + 8HCl$$

The steel baseplates are heated to 1000–1400° C. in an atmosphere of hydrogen and nitrogen and the tetrachloride vapour. The plates are heated by an induction heater at atmospheric pressure or slightly below. Suitable means are provided for absorbing the liberated hydrochloric acid vapour. TiN has been previously deposited in this on wires of tungsten and molybdenum by Moers (Z. für anorg. and allg. Chemie 196 233, 1931) and Pollard and Woodward (J. Chem. Soc. 1709 1948).

Using four discs made in accordance with the invention in full wave bridge connection with one disc per arm of the bridge, examples of the electrical properties obtained are:

| A. C. Volts Applied | D. C. Volts Output | Current mA./cm.² |
|---|---|---|
| 20 | 12.5 | 150 |
| 20 | 14.5 | 59 |
| 20 | 15.5 | 19 |
| 20 | 16.2 | 6.5 |

While the principles of the invention have been described in connection with specific embodiments and particular modifications thereof, it is to be clearly understood that this description is made by way of example and not as a limitation on the scope of the invention.

What I claim is:

1. An alternating current rectifier of the dry contact type comprising titanium nitride in intimate contact with a metallic oxide counter-electrode.

2. An A. C. rectifier as claimed in claim 1 and in which said counter-electrode consists of a mixture of metallic oxides.

3. An A. C. rectifier as claimed in claim 2 and in which said counter-electrode mixture comprises a metallically-conducting oxide.

4. An A. C. rectifier as claimed in claim 2 and in which said counter-electrode mixture comprises thallic oxide in a proportion of the order of 10-20% by weight.

5. An A. C. rectifier as claimed in claim 2 in which said mixture also comprises natural manganese dioxide.

6. An A. C. rectifier as claimed in claim 2 in which said mixture also comprises bismuth oxide.

7. An A. C. rectifier as claimed in claim 2 in which said mixture also comprises antimony oxide.

8. An A. C. rectifier as claimed in claim 2 in which said counter-electrode also comprises an oxide conferring stability and an oxide conferring activity.

9. An A. C. rectifier as claimed in claim 4 and in which said mixture also comprises natural manganese dioxide of the order of 60% and tellurium dioxide of the order of 30%.

10. An A. C. rectifier as claimed in claim 4 and in which said mixture also comprises bismuth oxide and natural manganese dioxide in substantially equal proportions.

11. An A. C. rectifier as claimed in claim 1 in which said titanium nitride constitutes a coating on a disc or plate of titanium.

12. An A. C. rectifier as claimed in claim 1 in which said titanium nitride constitutes a coating on mild steel.

RONALD ALFRED HILL.

References Cited in the file of this patent

UNITED STATES PATENTS

| Number | Name | Date |
|---|---|---|
| 879,062 | Pierce | Feb. 11, 1908 |
| 2,371,660 | Wainer | Mar. 20, 1945 |

FOREIGN PATENTS

| Number | Country | Date |
|---|---|---|
| 483,088 | Great Britain | Apr. 12, 1938 |